US010339323B2

(12) United States Patent
Ali et al.

(10) Patent No.: US 10,339,323 B2
(45) Date of Patent: Jul. 2, 2019

(54) GROUP LICENSE ENCRYPTION AND DECRYPTION

(71) Applicant: GOOGLE INC., Mountain View, CA (US)

(72) Inventors: Hamid Ali, Edmonds, WA (US); Li Bin, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 218 days.

(21) Appl. No.: 14/854,799

(22) Filed: Sep. 15, 2015

(65) Prior Publication Data

US 2017/0076097 A1    Mar. 16, 2017

(51) Int. Cl.
*H04L 29/06* (2006.01)
*G06F 21/60* (2013.01)
*G06F 21/10* (2013.01)
*H04L 9/14* (2006.01)

(52) U.S. Cl.
CPC ............ *G06F 21/602* (2013.01); *G06F 21/10* (2013.01); *G06F 21/105* (2013.01); *H04L 9/14* (2013.01); *G06F 2221/0755* (2013.01); *H04L 2209/24* (2013.01)

(58) Field of Classification Search
CPC ............ G06F 21/00; H04L 63/00; H04L 9/00
See application file for complete search history.

(56) References Cited

U.S. PATENT DOCUMENTS

| 8,121,294 | B2 | 2/2012 | Ciet et al. |
| 8,300,828 | B2 | 10/2012 | Ciet et al. |
| 8,359,473 | B1 | 1/2013 | Sorotokin et al. |
| 8,433,656 | B1 | 4/2013 | Evans et al. |
| 2004/0001594 | A1* | 1/2004 | Krishnaswamy ... H04L 63/0428 380/277 |
| 2004/0249755 | A1 | 12/2004 | Garibay et al. |

(Continued)

FOREIGN PATENT DOCUMENTS

| EP | 1221782 A1 | 7/2002 |
| WO | 2017/048631 A1 | 3/2017 |

OTHER PUBLICATIONS

International Search Report and Written Opinion for PCT Patent Application No. PCT/US2016/051314, dated Dec. 20, 2016, 10 pages.

*Primary Examiner* — Joseph P Hirl
*Assistant Examiner* — Leynna T Truvan
(74) *Attorney, Agent, or Firm* — Brake Hughes Bellermann LLP

(57) ABSTRACT

According to an aspect, a computing device may include a media content handler to obtain media content, a group license manager to determine whether or not the media content is part of a license group, and when the media content is determined as part of the license group, the group license manager may determine whether a master key for the license group was previously received. The group license manager may send, over a network, a license request to a license manager when the master key was not previously received. The group license manager may receive, over the network, a license to permit access to the media content, where the license includes the master key. The computing device may include a key generator to derive a content key based on the master key, and a decryption unit to decrypt the media content using the derived content key.

17 Claims, 8 Drawing Sheets

(56) References Cited

U.S. PATENT DOCUMENTS

2007/0157027 A1* 7/2007 Palekar ............... H04L 63/0428
                                                              713/171
2014/0189853 A1   7/2014 Epp et al.

* cited by examiner

GROUP LICENSE ENCRYPTION AND DECRYPTION

BACKGROUND

A license containing one or more content keys may be required to decrypt and playback media content. In some examples, the media content may include video files such as movies. In some examples, a device may be instructed to decrypt a relatively large number of movies, and thus requesting a license for each movie may be a problem due to network limitations and latency issues in the system. Furthermore, in some examples, a single movie may contain an audio track, a standard-definition (SD) video track, and potentially a high-definition (HD) video track, where each track may be encrypted with a different content key. According to conventional license exchange techniques, the device may be repeatedly requesting content keys from a license server, thereby increasing the amount of network traffic (e.g., for each track within each movie, the device may have to send a content identifier and then receive a unique content key). Furthermore, this increased network traffic may create even more of a congestion problem in locations that do not have a reliable network connection.

SUMMARY

The details of one or more implementations are set forth in the accompanying drawings and the description below. Other features will be apparent from the description and drawings, and from the claims.

According to an aspect, a computing device may include a media content handler configured to obtain media content, a group license manager configured to determine whether or not the media content is part of a license group, and when the media content is determined as part of the license group, the group license manager is configured to determine whether a master key for the license group was previously received. The group license manager may be configured to send, over a network, a license request to a license manager when the master key was not previously received. The license request may include a content identifier identifying the media content and a group identifier identifying the license group that includes the media content. The group license manager may be configured to receive, over the network, a license to permit access to the media content, where the license includes the master key corresponding to the license group. The computing device may include a key generator configured to derive a content key specific to the media content identified by the content identifier based on the master key, and a decryption unit configured to decrypt the media content using the derived content key such that the media content can be accessed.

The computing device may include one or more of the following features (or any combination thereof). The media content handler may be configured to obtain secondary media content, and the group license manager may be configured to determine that the secondary media content is part of the license group that includes the media content. The key generator may be configured to derive a secondary content key specific to the secondary media content based on the master key that was used to derive the media content, and the decryption unit may be configured to decrypt the secondary media content using the secondary content key. The license may also include the content key, where the decryption unit may use either the content key received as part of the license or the content key derived by the key generator for decrypting the media content. When the media content is determined as not part of the license group, the license manager may be configured to request and receive an individual content key from the license manager for decrypting the media content. When the master key has been determined as previously received, the key generator may be configured to derive the content key using the previously received master key. The key generator may be configured to derive the content key using a key derivation function inputted with the master key, the content identifier, and the group identifier. The group license manager may be configured to determine whether or not the media content is part of the license group based on an inclusion of the group identifier in the license request. The license group may include a plurality of movies, and the media content may be a single movie from the plurality of movies.

According to an aspect, a system may include a license manager configured to receive a license request from a computing device, where the license request includes a group identifier identifying a license group that includes the media content, and a key generator configured to obtain a master key using the group identifier, where the master key is a key for the license group such that a content key for each media content that is part of the license group can be derived using the master key. The license manager may be configured to send a license to the computing device, the license including the master key.

The computing device may include one or more of the above or below features (or any combination thereof). The license request may include a content identifier identifying media content, and the key generator may be configured to generate a content key for the media content identified by the content identifier, where the license includes both the master key and the content key. The key generator may be configured to obtain the master key from a master key database storing a plurality of master keys, where each of the plurality of master keys corresponds to a different license group. The computing device may include an encryption unit configured to encrypt the master key, and the license manager may be configured to send the license with the encrypted master key. The license manager may be configured to determine whether the media content is part of the license group based on an inclusion of the group identifier within the license request. Before the license request is received from the computing device, the license manager may be configured to receive a key request from a media content provider, where the key request includes the group identifier and a content identifier identifying the media content. The key generator may be configured to derive the content key based on the master key and the content identifier, and the license manager may be configured to return the content key to the media content provider such that the media content can be encrypted with the content key. The license manager may be configured to determine whether the media content is part of the license group based on an inclusion of the group identifier within the key request. When the key request does not include the group identifier, the key generator may be configured to derive the content key without using the master key. The media content may be a single track of a movie.

According to an aspect, a system may include a media content provider configured to send a key request to a license manager, where the key request includes a content identifier identifying media content, and a group identifier identifying a license group of the media content. The media content provider may be configured to receive a key response from the license manager, where the key response includes a content key that is specific to the media content identified by the content identifier. The system may include a provider encryption unit configured to encrypt the media content with the content key, where the media content provider is configured to provide the encrypted media content for access.

The system may include one or more of the above or below features (or any combination thereof). The content key included in the key response may be an encrypted content key, and the system further includes a provider decryption unit configured to decrypt the encrypted content key. The provider encryption unit may be configured to use the decrypted content key to encrypt the media content. The provider encryption unit may be configured to encrypt all media content belonging to the license group with a unique content key that has been derived from a same master key. The license group may define a plurality of movies, and the media content may represent a single move.

DETAILED DESCRIPTION

The implementations discussed herein provide a group license mechanism in which all media content of a license group is encrypted with a unique content key that is derived from a master key. Then, a computing device may retrieve the master key from a license manager and can use the master key to derive content keys for all media content part of the license group in order to decrypt and playback any media content part of the license group. As a result, instead of consuming a large amount of resources by repeatedly requesting a separate content key for each media content, the computing device may send a single license request to the license manager for a license that can be used to decrypt all media content in the license group, thereby minimizing network traffic to the license manager. Furthermore, in some implementations, the content keys are not stored in the system because the content keys are derived from the master key, which may lead to a more secure license exchange system.

Figure 1:
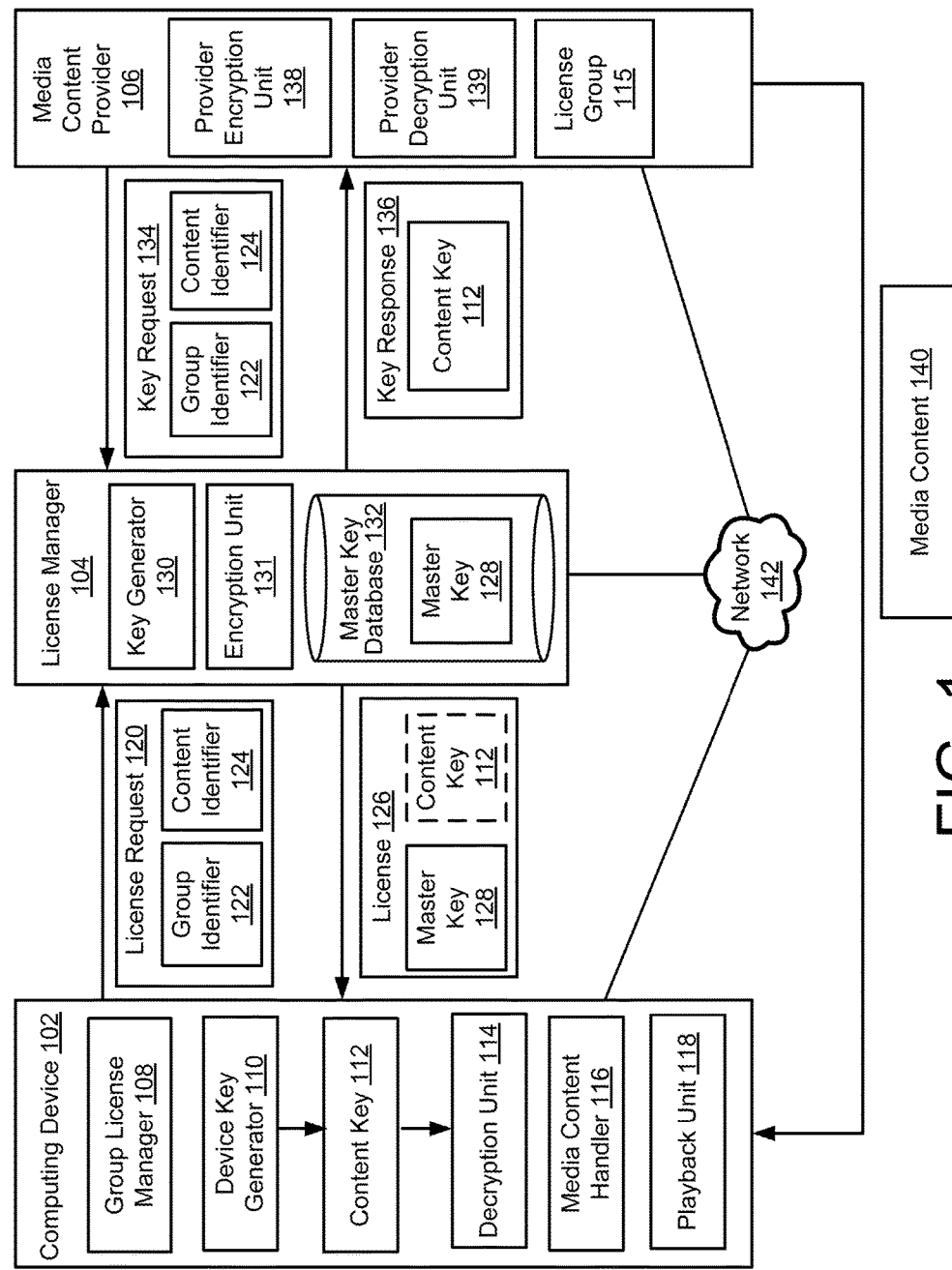
FIG. 1 is a block diagram of a system for implementing a group license mechanism for controlling download and playback of media content according to an aspect.

FIG. 1 is a block diagram of a system 100 for implementing a group license mechanism for controlling download and playback of media content 140 in which each media content 140 belonging to a license group 115 is encrypted and decrypted with a unique content key 112 derived from a master key 128 according to an aspect. The system 100 may include a computing device 102, a license manager 104, and a media content provider 106, which may be connected to each other via a network 142.

The computing device 102 may be a mobile computing device (e.g., a smart phone, a PDA, a tablet, a laptop computer, media streaming device, etc.) or a nonmobile computing device (e.g., a desktop computing device, gaming console, etc.). The computing device 102 may include various network interface circuitry, such as for example, a network interface through which the computing device 102 can communicate with the network 142. The network 142 may include one or more private and/or public networks including a cellular network, a Wi-Fi network with which the computing device 102 can communicate with a Wi-Fi base station, a Bluetooth network with which the computing device 102 can communicate with other Bluetooth devices, and/or an Ethernet connection or other wired connection that enables the computing device 102 to access the network 142.

The computing device 102 may access the media content provider 106 via the network 142 to obtain the media content 140. For example, the computing device 102 may communicate with the media content provider 106 to view, access, download, stream, and/or playback the media content 140 on the computing device 102 via a playback unit 118 configured to render the media content 140. The playback unit 118 may be capable of rendering any video, software, audio, image, and/or textual data defined by the media content 140. Also, the computing device 102 may include one or more computer processors coupled to one or more substrates, and a non-transitory computer readable medium that stores executable instructions that when executed by the one or more computer processors are configured to implement the various functionalities described herein.

The media content provider 106 may include one or more media content sources that distribute the media content 140 over the network 142 to a plurality of computing devices including the computing device 102. In some examples, the media content provider 106 may be one or more online digital media stores that provide the media content 140 for free or purchase to the computing device 102. The media content provider 106 may include one or more server devices having one or more network interfaces capable of connecting to the network 142. In some examples, the media content provider 106 may include one or more computer processors coupled to one or more substrates, and a non-transitory computer readable medium that stores executable instructions that when executed by the one or more computer processors are configured to implement the various functionalities described herein.

The license manager 104 may be configured to manage and create licenses 126 for the media content 140 provided by the media content provider 106. In some examples, the license manager 104 may include a license server functioning as a centralized computer system which implements at least part of the group license mechanism discussed herein. The license manager 104 may provide content keys 112 to the media content provider 106 such that each media content 140 can be encrypted prior to distribution, and provide master keys 128 (and potentially content keys 112) to the computing device 102 such that the computing device 102 can decrypt and playback the media content 140. In some examples, the license manager 104 may include one or more license server devices having one or more network interfaces capable of connecting to the network 142. In some examples, the license manager 104 may include one or more computer processors coupled to one or more substrates, and a non-transitory computer readable medium that stores executable instructions that when executed by the one or more computer processors are configured to implement the various functionalities described herein. In some examples, the license manager 104 may be implemented on one or more servers separate from the server(s) implementing the media content provider 106, and any communication between the license manager 104 and the media content provider 106 are transmitted over the network 142 via an established network (Internet) communication protocol. In some examples, the license manager 104 may be part of the media content provider 106.

The media content 140 may refer to any content in which a license 126 is required to access (e.g., playback) the media content 140. The media content 140 may include video, software, audio, image, and/or textual data. In some examples, the media content 140 may include digital media content such as digitally broadcast, streamed, or provided as part of a computer file format. In some examples, the media content 140 may include video content. In some examples, the media content 140 may include audio content. In some examples, the media content 140 may include a movie. In some examples, the media content 140 may refer to a single track of a movie. For example, a movie may be defined by an audio track, and one or more video tracks such as a high-definition (HD) track, a standard-definition (SD) track, and a 4K resolution track. Depending on the context, the media content 140 may refer to one of the audio track, the HD track, the SD track, and the 4K resolution track. In other examples, the media content 140 may refer to the movie as a whole (e.g., the audio track, HD track, the SD track, and potentially the 4K resolution track).

Figure 2:
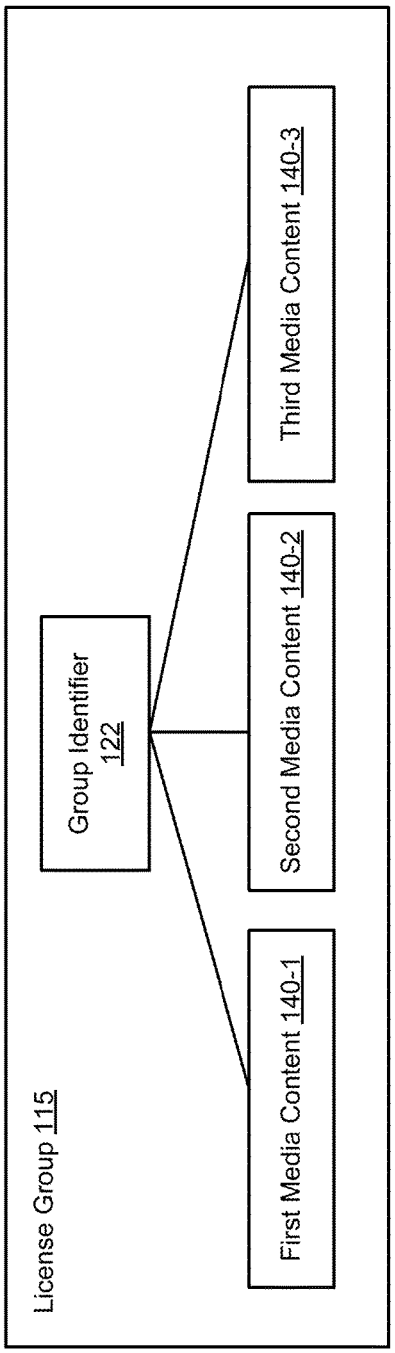
FIG. 2 illustrates an example of a license group of the system of FIG. 1 according to an aspect.

FIG. 2 illustrates an example of the license group 115 according to an aspect. The license group 115 may be associated with a group identifier 122. The group identifier 115 may be an identifier that uniquely identifies a particular license group 115. The group identifier 115 may be a data representation that uniquely identifies the license group 115. In some examples, the group identifier 115 is a numeric identifier.

The license group 115 may define a plurality of media contents such as a first media content 140-1, a second media content 140-2, and a third media content 140-3. Although FIG. 2 illustrates three separate items of media content 140, the license group 115 may define any number of media content 140. In some examples, the first media content 140-1, the second media content 140-2, and the third media content 140-3 include content different from each other. In some examples, the first media content 140-1 refers to a first movie, the second media content 140-2 refers to a second movie, and the third media content 140-3 refers to a third movie. In some examples, with respect to a particular movie, the first media content 140-1 may refer to the audio track, the second media content 140-2 may refer to the HD track, and the third media content 140-3 may refer to the SD track. It is noted that the movie examples used throughout this disclosure are merely example implementations of the numerous types of content which may be covered by the media content 140.

Referring to FIGS. 1-2, the media content provider 106 may define the license group 115. For example, the media content provider 106 may indicate which media content 140 belongs to the license group 115. For example, the media content provider 106 may define that movie #1 through movie #50 are part of a first license group, and movie #51 to movie #100 are part of a second license group. In some examples, the media content provider 106 may associate a group identifier 122 with the first media content 140-1, and assign the same group identifier 122 to the second media content 140-2 and the third media content 140-3. The assignment of the group identifier 122 to the first media content 140-1 may indicate that the first media content 140-1 is part of (or belongs to) the license group 115.

The media content provider 106 may include an provider encryption unit 138 configured to encrypt each media content 140 of the license group 115 with a unique content key 112 that was derived from a same master key 128. For example, the provider encryption unit 138 may be configured to encrypt the first media content 140-1 with a first content key (e.g., first content key 112-1 shown in FIG. 3), encrypt the second media content 140-2 with a second content key (e.g., second content key 112-2 shown in FIG. 3), and encrypt the third media content 140-3 with a third content key (e.g., third content key 112-3 shown in FIG. 3). The first content key 112-1, the second content key 112-2, and the third content key 112-3 may be unique to each other. The first content key 112-1, the second content key 112-2, and the third content key 112-3 may be derived from the same master key 128, as further explained below.

The media content provider 106 may send a key request 134 for a content key 112 and receive a key response 136 having the content key 112 for the media content 140. The key request may include a content identifier 124 that uniquely identifies the media content 140, and the group identifier 122 that identifies the license group 115 of the media content 140. The inclusion of the group identifier 122 in the key request 134 may indicate that the media content provider 106 has assigned the media content 140 to the license group 115.

In particular, the media content provider 106 may send the key request 134 as a first key request for the first content key 112-1 to the license manager 104, and receive the key response 136 as a first key response from the license manager 104. The first key request may include the content identifier 124 that is specific to the first media content 140-1, and the group identifier 122 of the license group 115 in which the first media content 140-1 belongs to. The first key response may include the first content key 112-1 that is specific to the first media content 140-1 (e.g., only the first content key 112-1 is capable of unlocking the first media content 140-1). In some examples, the first content key 112-1 is an encrypted content key. In other examples, the first content key 112-1 is an unencrypted content key. Then, the provider encryption unit 138 of the media content provider 106 may encrypt the first media content 140-1 with the first content key 112-1. Also, the media content provider 106 may include a provider decryption unit 139 configured to decrypt the first content key 112-1 (if the first content key 112-1 is encrypted). Then, the provider encryption unit 138 may encrypt the first media content 140-1 with the decrypted first content key 112-1.

The media content provider 106 may send the key request 134 as a second key request for the second content key 112-2 to the license manager 104, and receive the key response 136 as a second key response from the license manager 104. The second key request may include the content identifier 124 that is specific to the second media content 140-2, and the group identifier 122 of the license group 115 in which the second media content 140-2 belongs to. The second key response may include the second content key 112-2 that is specific to the second media content 140-2 (e.g., only the second content key 112-2 is capable of unlocking the second media content 140-2). In some examples, the second content key 112-2 is an encrypted content key. In other examples, the second content key 112-2 is an unencrypted content key. Then, the provider encryption unit 138 of the media content provider 106 may encrypt the second media content 140-2 with the second content key 112-2, or the provider decryption unit 139 may decrypt the second content key 112-2 (if the second content key 112-2 is encrypted), and the provider encryption unit 138 may encrypt the second media content 140-2 with the decrypted second content key 112-2.

With respect to the third media content 140-2, the media content provider 106 may send the key request 134 and receive the key response 136 as a third key request and a third key response, respectively, in the same manner as described above. In some examples, the key requests 134 of all the media content 140 belonging to the same license group 115 may be sent sequentially (e.g., the first key request followed by the second key request followed by the third key request). In other examples, the key requests 134 for all media content 140 of the license group 115 may be sent at the same time (or around the same time). In other examples, the media content provider 106 may send a single key request 134 to request the content keys 112 for all the media content 140 of the license group 115, and receives a single key response 136 having all the content keys 112 for the license group 115. In this example, the key request 134 may specify the content identifier 124 for each media content 140 part of the license group 115, and the group identifier 122 for the license group 115.

The license manager 104 may include a key generator 130 configured to derive the content key 112 specific to the media content 140 identified by the content identifier 124 from the master key 128 that corresponds to the license group 115 pertaining to the content identifier 124 in response to receiving the key request 134. For example, the key generator 130 may be configured to obtain the master key 128 corresponding to the license group 115 from a master key database 132 storing a plurality of master keys 128. Each master key 128 in the master key database 132 may correspond to a different license group 115. In some examples, the key generator 130 may use the group identifier 122 to search the master key database 132 to locate the appropriate master key 128. In other examples, the key generator 130 may obtain the master key 128 by deriving (or generating) the master key 128.

Figure 3:
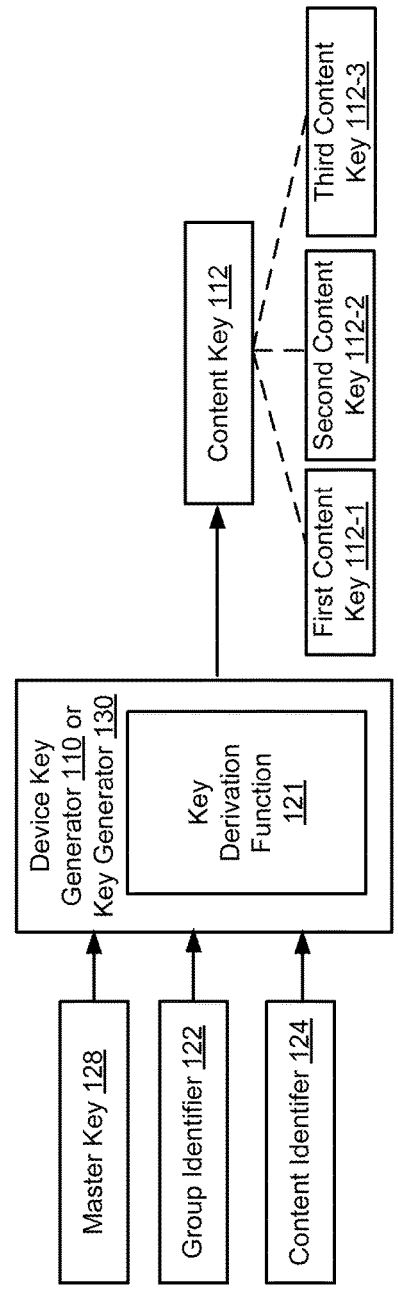
FIG. 3 illustrates an example of a key generator of the system of FIG. 1 according to an aspect.

FIG. 3 illustrates an example of the key generator 130 of the license manager 104 or a device key generator 110 of the computing device 102 according to an aspect. The device key generator 110 of the computing device 102 may include functionalities that operate in the same manner as at least some of the functionalities of the key generator 130 of the license manager 104. The device key generator 110 of the computing device 102 is described later in the disclosure.

The key generator 130 of the license manager 104 may generate the content key 112 based on the master key 128, the group identifier 122, and the content identifier 124. For example, with respect to the first media content 140-1, the key generator 130 may derive the content identifier 124 for the first media content 140-1 and the group identifier 122 of the license group 115 from the received key request 134. Inclusion of the group identifier 122 in the key request 134 may indicate to the key generator 130 that the first media content 140-1 is apart of the license group 115 having the group identifier 122 that uniquely identifies the license group 115. Then, the key generator 130 may determine to derive the first content key 112-1 for the first media content 140-1 using the master key 128 corresponding to the license group 115. Otherwise, if the key request 134 does not contain the group identifier 122, the key generator 130 may generate an individual content key for the first media content 140-1 without using the master key 128. However, since the key request 134 includes the group identifier 122, the key generator 130 may use the group identifier 122 to locate the master key 128 corresponding to the license group 115 from the master key database 132. Then, the key generator 130 may derive the first content key 112-1 based on the master key 128 for the license group 115, the group identifier 122, and the content identifier 124 that uniquely identifies the first media content 140-1, as further explained below.

The key generator 130 may derive the first content key 112-1 using a key derivation function 121. The key derivation function 121 may be a deterministic algorithm to derive a key of a given size. In some examples, the key derivation function 121 generates the content key 112 as a 16 byte Advanced Encryption Standard (AES) based on the group identifier 122, and a length of 128 bits. However, the key derivation function 121 may use any type of key derivation functions parameters within AES or other encryption standards that is capable of deriving a unique content key. The key generator 130 may generate the second content key 112-2 for the second media content 140-2 and the third content key 112-3 for the third media content 140-3 in the same manner described.

Referring to back to FIG. 1, in some examples, the license manager 104 may include an encryption unit 131 configured to encrypt the content key 112, and send the encrypted content key 112 back to the media content provider 106 to be decrypted by the provider decryption unit 139. For example, the encryption unit 131 may encrypt the first content key 112-1, and send the first key response with the first content key 112-1 to the media content provider 106. Then, the provider decryption unit 139 may decrypt the first content key 112-1, and the provider encryption unit 138 may encrypt the first media content 140-1 using the decrypted first content key 112-1. Also, the encryption unit 131 may encrypt the second content key 112-2, and send the second key response with the second content key 112-2 to the media content provider 106. Then, the provider decryption unit 139 may decrypt the second content key 112-2, and the provider encryption unit 138 may encrypt the second media content 140-2 using the decrypted second content key 112-2.

Referring back to FIG. 1, the computing device 102 may access the media content provider 106 via the network 142 to obtain the media content 140. For example, the computing device 102 may communicate with the media content provider 106 to view, access, download, stream, and/or playback the media content 140 on the computing device 102 via the playback unit 118 configured to render the media content 140. However, the computing device 102 may be required to obtain a license 126 to view, access, download, stream, and/or playback the media content 140 on the computing device 102. According to the embodiments, the computing device 102 is not required to send a separate license request 120 for each media content 140 of the license group 115. Rather, the computing device 102 may receive a single license 126 that is used to decrypt all media content 140 of the license group 115, thereby minimizing network traffic to the license manager 104.

For example, a media content handler 116 of the computing device 102 may obtain the first media content 140-1 for playback. The media content handler 116 may obtain the first media content 140-1, over the network 142, from the media content provider 106. In other examples, the media content handler 116 may obtain the first media content 140-1 from a storage area of the computing device 102. In some examples, the media content handler 116 may determine that a license 126 is required to access the first media content 140-1.

The computing device 102 may include a group license manager 108 configured to determine whether or not the first media content 140-1 is part of the license group 115. In some examples, the group license manager 108 may determine whether or not a group identifier 122 is associated with the first media content 140-1. If the group identifier 122 is included as part of the first media content 140-1 (e.g., included as meta-data associated with the first media content 140-1), the group license manager 108 may determine that the first media content 140-1 is part of the license group 115. On the other hand, if the group identifier 122 is not provided with the first media content 140-1, the group license manager 108 may determine that the first media content 140-1 is not part of the license group 115. If the first media content 140-1 is not part of a license group 115, the group license manager 108 may request and receive an individual content key for the first media content 140-1 in accordance with standard license exchange techniques.

However, when the first media content 140-1 is determined as part of the license group 115, the group license manager 108 may determine whether or not the master key 128 for the license group 115 was previously received. For example, the group license manager 108 may determine whether it has access to the master key 128 (e.g., whether it is stored locally in a storage unit of the computing device 102). If the group license manager 108 determines that it has not previously received the master key 128 for that license group 115, the group license manager 108 may send, over the network 142, a license request 120 to the license manager 104. The license request 120 may include the group identifier 122 of the license group 115 corresponding to the media content 140, and the content identifier 124 that uniquely identifies the first media content 140-1.

The license manager 104 may receive the license request 120, over the network 142, from the computing device 102, and obtain the master key 128 for the license group 115 from the master key database 132. For example, the license manager 104 may use the group identifier 122 of the license request 120 to obtain the correct master key 128 from the master key database 132. Then, the license manager 104 may send the license 126 having the master key 128 back to the computing device 102. In some examples, in response to receiving the license request 120, the key generator 130 may derive the first content key 112-1, and send the license 126 with both the master key 128 and the first content key 112-1. Then, the computing device 102 may use either the first content key 112-1 received as part of the license 126 or derive the first content key 112-1 using the master key 128. In some examples, the encryption unit 131 may be configured to encrypt the master key 128, and the license manager 104 may send the license 126 with the encrypted master key 128. In some examples, the encryption unit 131 may encrypt the master key 128 and the first content key 112-1, and the license manager 104 may send the license 126 with the encrypted master key 128 and the encrypted first content key 112-1.

The group license manager 108 may receive, over the network 142, the license 126 from the license manager 104. If the master key 128 is encrypted, the decryption unit 114 may decrypt the master key 128. If the master key 128 and the first content key 112-1 are encrypted, the decryption unit 114 may decrypt the master key 128 and the first content key 112-1. Then, the device key generator 110 may derive the first content key 112-1 for the first media content 140-1 based on the master key 128 received as part of the license 126. This process may be the same as previously described above. For example, referring to FIG. 3, the device key generator 110 may derive the first content key 112-1 based on the master key 128, the group identifier 122, and the content identifier 124. The derived first content key 112-1 is unique to the first media content 140-1 specified by the content identifier 124. In some examples, the device key generator 110 may generate the first content key 112-1 using the key derivation function 121 inputted with the master key 128, the group identifier 122, and the content identifier 124. The decryption unit 114 may decrypt the first media content 140-1 using the derived first content key 112-1, and the playback unit 118 configured to playback the decrypted first media content 140-1.

Then, when the media content handler 116 obtains the second media content 140-2, and the second media content 140-2 is part of the same license group 115, the computing device 102 does not send another license request 120. Rather, the group license manager 108 may determine that the second media content 140-2 is part of the license group 115 (e.g., due to the presence of the group identifier 122), and may determine that it has previously received the master key 128 for the license group 115. The device key generator 110 may generate the second content key 112-2 for the second media content 140-2 based on the same master key 128 that was used to generate the first content key 112-1 for the first media content 140-1. For instance, the device key generator 110 may derive the second content key 112-2 for the second media content 140-2 using the key derivation function 121 inputted with the master key 128, the group identifier 122, and the content identifier 124 specific to the second media content 140-2. The decryption unit 114 may be configured to decrypt the second media content 140-2 using the second content key 112-2 for the second media content 140-2.

These operations may be repeated for all media content 140 of the license group 115 such that license requests do not need to be sent to the license manager 104. Rather, the content keys 112 for the other media content 140 of the same license group 115 can be derived by the device key generator 110. Also, the content keys 112 are not stored anywhere in the system 100 because the content keys 112 are derived from the master key 128, thereby making the system 100 more secure.

Figure 4:
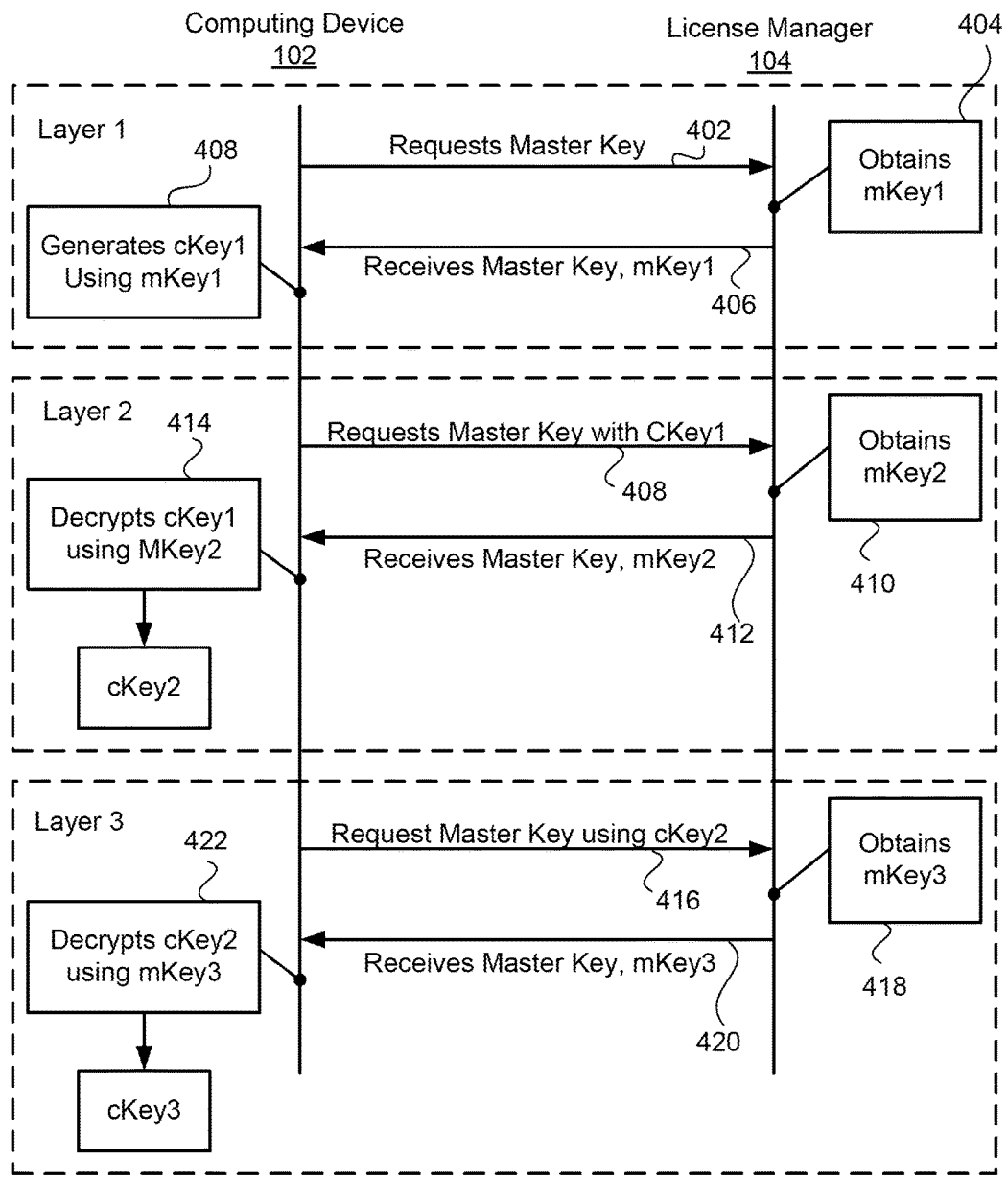
FIG. 4 illustrates an example of the group license mechanism with a plurality of protection layers for protecting a content key according to an aspect.

FIG. 4 illustrates an example of the group license exchange with a plurality of protection layers for protecting the content key 112 according to an aspect. For example, FIG. 4 illustrates a message sequence between the computing device 102 and the license manager 104 that protects the content key 112 according to a number of protection layers. Although FIG. 4 illustrates three protection layers (e.g., layer 1, layer 2, and layer 3), the implementations may include any number of protection layers (e.g. two protection layers or more than three protection layers).

In a first layer of protection, in operation 402, the computing device 102 may request a first master key. For example, the group license manager 108 may be configured to send a first master key request over the network 142 to the license manager 104 to obtain the first master key (mKey1) for the license group 115. In operation 404, the license manager 104 may obtain the first master key (mKey1). For example, the key generator 130 may obtain or derive the first master key (mKey1) from the master key database 132. In operation 406, the license manager 104 may send the first master key (mKey1), and the computing device 102 may receive the first master key (mKey1). In operation 408, the computing device 102 may generate a first content key (cKey1) using the first master key (mKey1). For example, the device key generator 110 of the computing device 102 may derive the first content key (cKey1) using the key derivation function 121 inputted with the first master key (mKey1), the group identifier 122, and the content identifier 124 corresponding to the media content 140 to be decrypted.

In a second layer of protection, in operation 408, the computing device 102 requests another master key with the first content key (cKey1). For example, the group license manager 108 may be configured to send a master key request over the network 142 to the license manager 104 to obtain another master key 128 for the license group 115. In operation 410, the license manager 104 obtains a second master key (mKey2). For example, the key generator 130 may obtain or derive the second master key (mKey2) from the master key database 132. In operation 412, the license manager 104 may send the second master key (mKey2), and the computing device 102 may receive the second master key (mKey2). In operation 414, the computing device 102 may decrypt the first content key (cKey1) using the second master key (mKey2), thereby obtaining a second content key (cKey2).

In a third layer of protection, in operation 416, the computing device 102 request another master key using the second content key (cKey2). For example, the group license manager 108 may send a master key request over the network 142 to the license manager 104 to obtain yet another master key 128 for the license group 115. In operation 418, the license manager 104 may obtain a third master key (mKey3). For example, the key generator 130 may obtain or derive the third master key (mKey3) from the master key database 132. In operation 420, the license manager 104 may send the third master key (mKey3), and the computing device 102 may receive the third master key (mKey3). In operation 422, the computing device 102 may decrypt the second content key (cKey2) using the third master key (mKey3), thereby obtaining a third content key (cKey3). In some examples, the decryption unit 114 may decrypt the media content 140 using the third content key (cKey3). In other examples, additional layers of protection are added by repeating the previous operations to obtain a fourth content key, fifth content key, etc.

Figure 5:
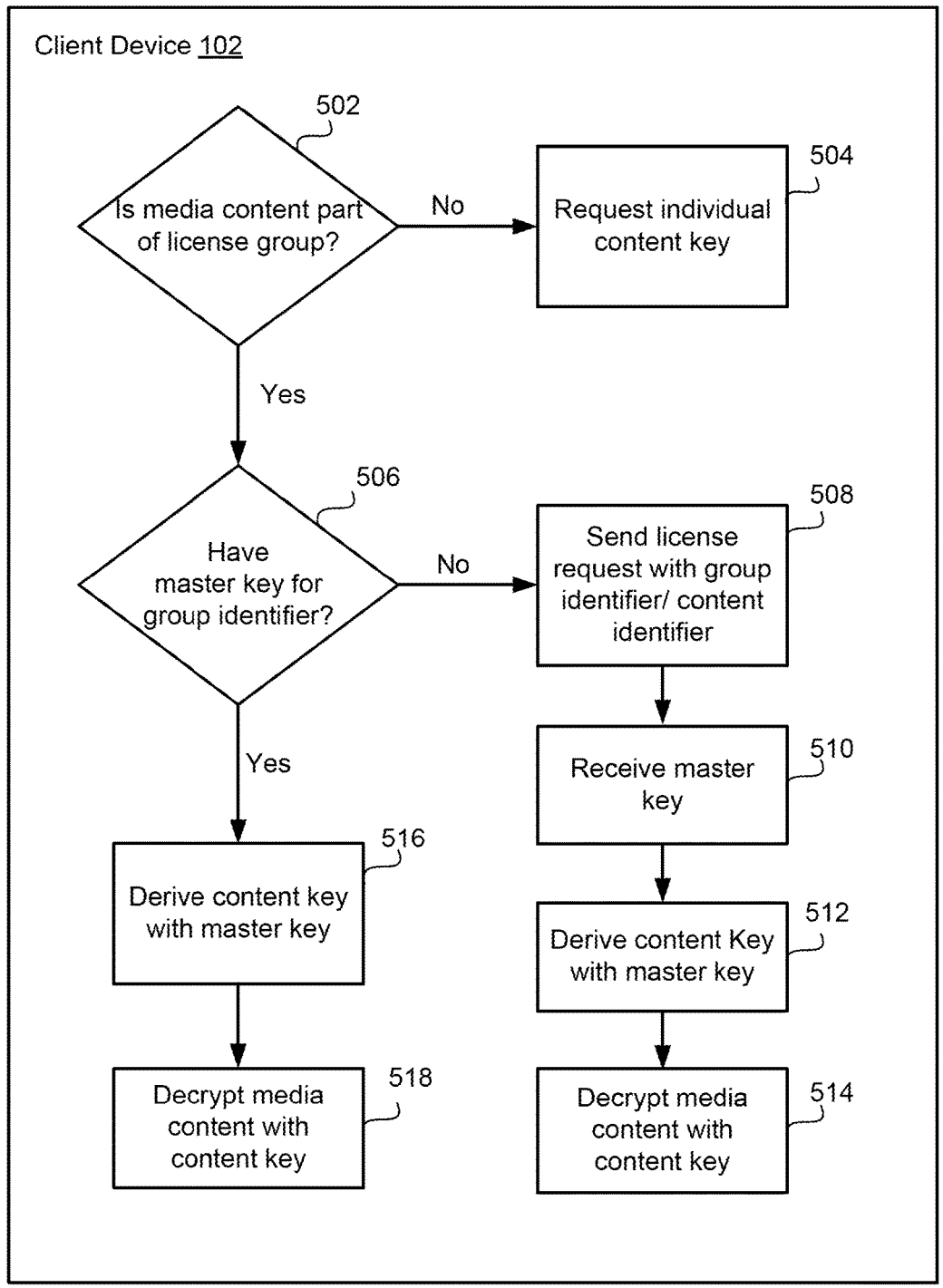
FIG. 5 illustrates a flow chart depicting example operations of a computing device of the system of FIG. 1 according to an aspect.

FIG. 5 illustrates a flow chart depicting example operations of the computing device 102 implementing the group license exchange mechanism of the system 100 of FIG. 1 according to an aspect. Although the flowchart of FIG. 5 illustrates the operations 502-518 in sequential order, it will be appreciated that this is merely an example, and that additional or alternative operations may be included. Further, operations of FIG. 5 and related operations may be executed in a different order than that shown, or in a parallel or overlapping fashion.

It may be determined whether media content is part of a license group (502). For example, the group license manager 108 configured to determine whether or not the first media content 140-1 is part of the license group 115. In some examples, the group license manager 108 may determine whether or not a group identifier 122 is associated with the first media content 140-1. The group identifier 122 may uniquely identify the license group 115. If the group identifier 122 is included as part of the first media content 140-1 (e.g., included as meta-data associated with the first media content 140-1), the group license manager 108 may determine that the first media content 140-1 is part of the license group 115. On the other hand, if the group identifier 122 is not provided with the first media content 140-1, the group license manager 108 may determine that the first media content 140-1 is not part of the license group 115.

When the media content is determined as not part of the license group (No), an individual content key may be requested (504). For example, if the first media content 140-1 is not part of the license group 115, the group license manager 108 may request and receive an individual content key for the first media content 140-1 in accordance with standard license exchange techniques. In some examples, this content key was generated at the license manager 104 without using the master key 128.

When the media content is determined as part of the license group (Yes), it may be determined whether the computing device has a master key for the group identifier (506). For example, when the first media content 140-1 is determined as part of the license group 115, the group license manager 108 may determine whether or not the master key 128 for the license group 115 was previously received. For example, the group license manager 108 may determine whether it has access to the master key 128 (e.g., whether it is stored locally in a storage unit of the computing device 102).

When it has been determined that the computing device does not have the master key for the group identifier (No), a license request with the group identifier and the content identifier may be sent (508). For example, if the group license manager 108 determines that it has not previously received the master key 128 for that license group 115, the group license manager 108 may send, over the network 142, a license request 120 to the license manager 104. The license request 120 may include the group identifier 122 of the license group 115 corresponding to the media content 140, and the content identifier 124 that uniquely identifies the first media content 140-1.

A master key may be received (510). For example, the license manager 104 may receive the license request 120, over the network 142, from the computing device 102, and obtain the master key 128 for the license group 115 from the master key database 132. For example, the license manager 104 may use the group identifier 122 of the license request 120 to obtain the correct master key 128 from the master key database 132. Then, the computing device may receive the license with the master key 128 from the license manager 104.

A content key may be derived with the master key (512). For example, the device key generator 110 may derive the first content key 112-1 for the first media content 140-1 based on the master key 128 received as part of the license 126. In some examples, the device key generator 110 may generate the first content key 112-1 using the key derivation function 121 inputted with the master key 128, the group identifier 122, and the content identifier 124. In some examples, the device key generator 110 may derive the first content key 112-1 using the key derivation function 121. The key derivation function 121 may be a deterministic algorithm to derive a key of a given size. In some examples, the key derivation function 121 generates the first content key 112-1 as a 16 byte Advanced Encryption Standard (AES) based on the group identifier 122, and a length of 128 bits.

Media content may be decrypted with the content key (514). For example, the decryption unit 114 may be configured to decrypt the first media content 140-1 using the derived first content key 112-1.

When it has been determined that the computing device has the master key for the group identifier (Yes), the content key may be derived with the master key (516). For example, instead of sending a license request 120, the group license manager 108 determines that it already has received a license 126 for the first media content 140-1 because it previously received the master key 128 for the license group 115 which the first media content 140-1 belongs to. Then, instead of performing operations 508-510, the device key generator 110 may derive the first content key 112-1 using the previously received master key 128.

Media content may be decrypted with the content key (518). For example, the decryption unit 114 may be configured to decrypt the first media content 140-1 using the derived first content key 112-1.

These operations may be repeated for all media content 140 of the license group 115 such that license requests do not need to be send to the license manager 104. Rather, the content keys 112 for the other media content 140 of the same license group 115 can be derived by the device key generator 110. Also, the content keys 112 are not stored anywhere in the system 100 because the content keys 112 are derived from the master key 128, thereby making the system 100 more secure.

Figure 6:
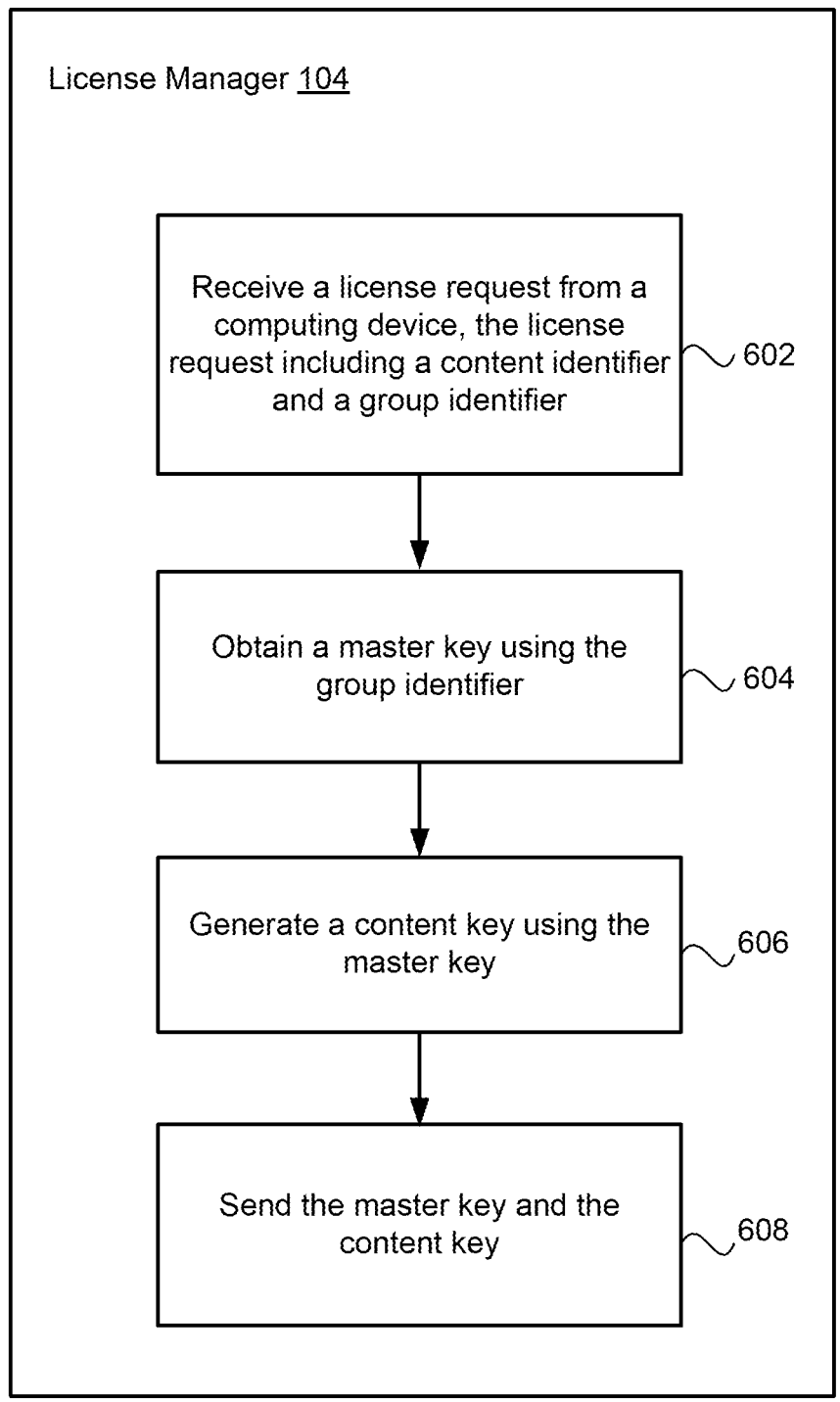
FIG. 6 illustrates a flow chart depicting example operations of a license manager of the system of FIG. 1 according to an aspect.

FIG. 6 illustrates a flow chart depicting example operations of the license manager 104 implementing the group license exchange mechanism of the system 100 of FIG. 1 according to an aspect. Although the flowchart of FIG. 6 illustrates the operations 602-608 in sequential order, it will be appreciated that this is merely an example, and that additional or alternative operations may be included. Further, operations of FIG. 6 and related operations may be executed in a different order than that shown, or in a parallel or overlapping fashion.

A license request may be received from a computing device, where the license request includes a content identifier and a group identifier (602). For example, the license manager 104 may receive the license request 120, over the network 142, from the computing device 102. The license request 120 may include the group identifier 122 that identifies the license group 115 in which the first media content 140-1 belongs to, and the content identifier 124 that uniquely identifies the first media content 140-1.

A master key may be obtained using the group identifier (604). For example, in response to receiving the license request 120, the key generator 130 may obtain the master key 128 corresponding to the license group 115 identified by the group identifier 122 from the master key database 132.

A content key may be generated using the master key (606). In some examples, the key generator 130 may derive the first content key 112-1 using the master key 128. For example, the key generator 130 may derive the first content key 112-1 using the key derivation function 121 inputted with the group identifier 122, the content identifier 124, and the obtained master key 128.

The master key and the content key may be sent to the computing device (608). For example, the license manager 104 may send a license 126 back to the computing device, where the license 126 includes the master key 128 and the first content key 112-1. The computing device 102 may decrypt the first media content 140-1 with the first content key 112-1 received as part of the license 126 or derive the first content key 112-1 using the master key 128. Also, for all other media content (e.g., second media content 140-2, third media content 140-3), the computing device 102 does not have to send another license request 120. Rather, the computing device 102 may use the master key 128 received as part of the license 126 to derive individual content keys 112 for any media content 140 apart of the license group 115.

Figure 7:
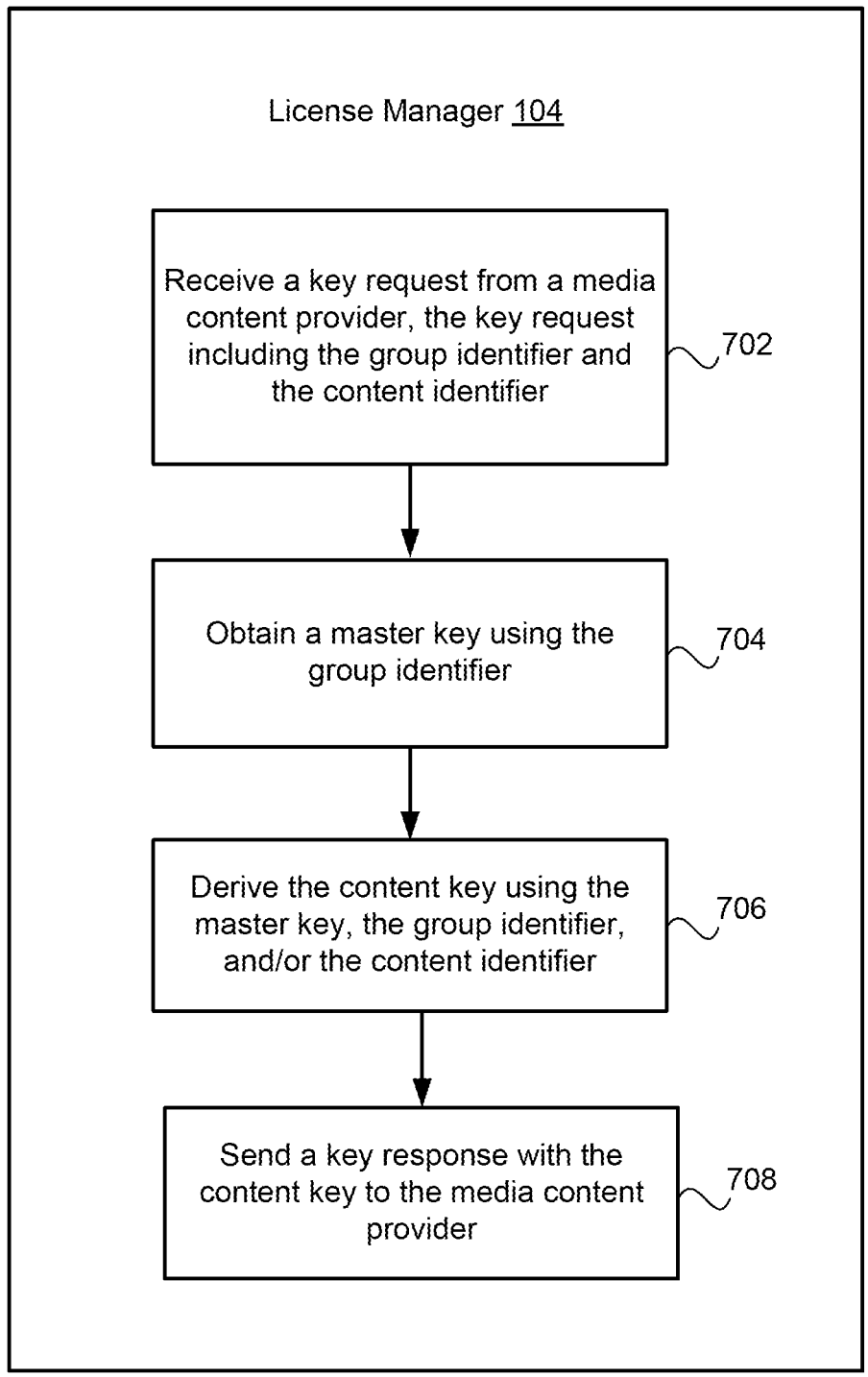
FIG. 7 illustrates a flow chart depicting example operations of the license manager of the system of FIG. 1 according to an aspect.

FIG. 7 illustrates a flow chart depicting example operations of the license manager 104 implementing the group license exchange mechanism of the system 100 of FIG. 1 according to another aspect. Although the flowchart of FIG. 7 illustrates the operations 702-708 in sequential order, it will be appreciated that this is merely an example, and that additional or alternative operations may be included. Further, operations of FIG. 7 and related operations may be executed in a different order than that shown, or in a parallel or overlapping fashion.

A key request may be received from a media content provider, where the key request includes the group identifier and the content identifier (702). For example, the license manager 104 may receive a key request 134 from the media content provider 106, where the key request 134 includes the content identifier 124 for the media content 140 in which the media content provider 106 is instructed to encrypt, and the group identifier 122 that corresponds to the license group 115 of the media content 140 specified by the content identifier 124. For example, the license manager 104 may receive a key request 134 specifying the content identifier 124 for the first media content 140-1, and the group identifier 122 corresponding to the license group 115 of the first media content 140-1.

A master key may be obtained using the group identifier (704). For example, the key generator 130 may obtain the master key 128 that corresponds to the group identifier 122 from the master key database 132.

The content key may be derived using the master key, the group identifier, and the content identifier (706). For example, the key generator 130 may derive the first content key 112-1 for the first media content 140-1 using the master key 128. In some examples, the key generator 130 may use the key derivation function 121 inputted with the master key 128, the group identifier 122, and the content identifier 124 to derive the first media content 140-1.

A key response with the content key may be sent to the media content provider (708). For example, the license manager 104 may send the key response 136 with the derived first content key 112-1. Operations 702-708 may be repeated for each of the other media content 140 included as part of the license group 115.

Figure 8:
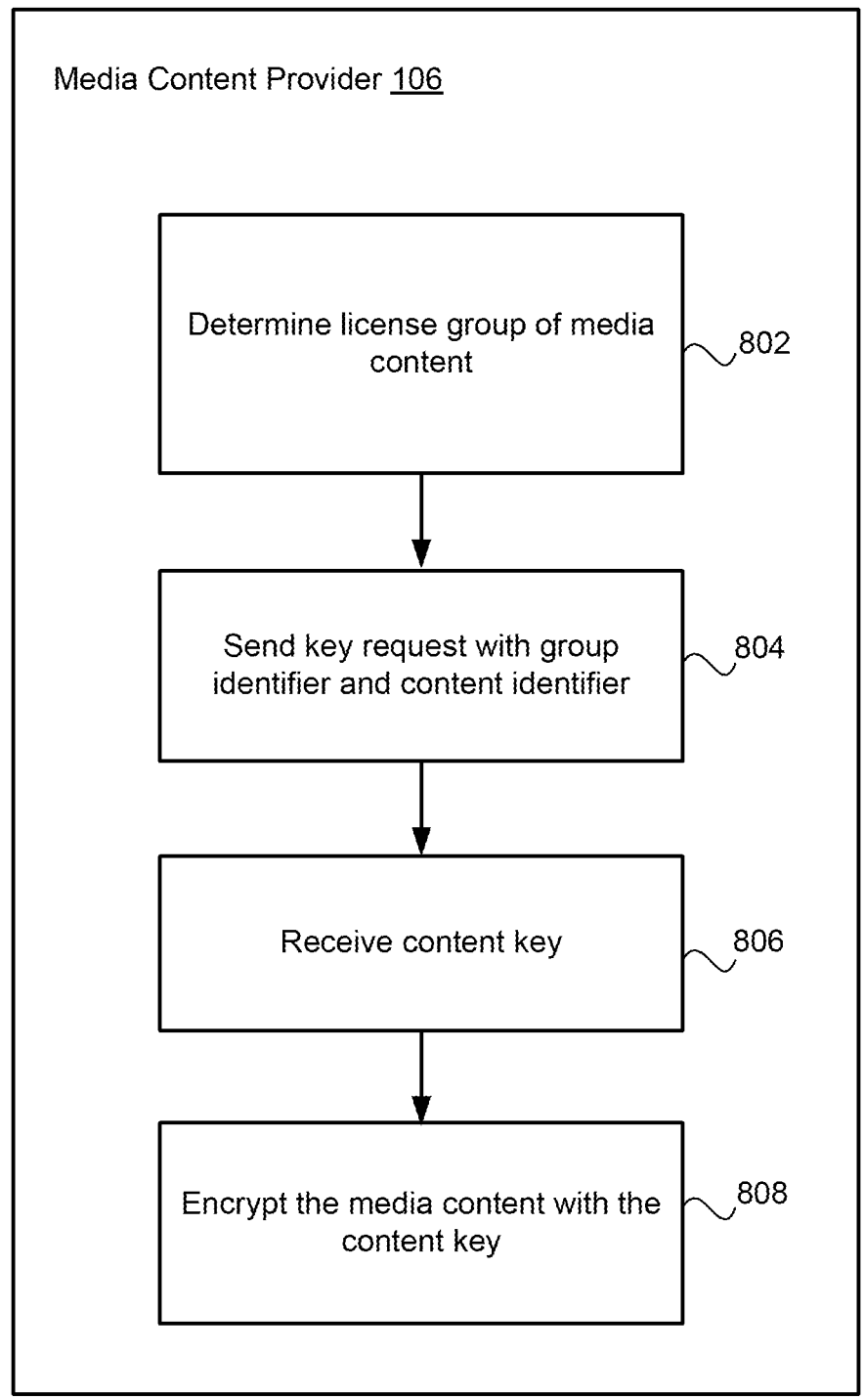
FIG. 8 illustrates a flow chart depicting example operations of a media content provider of the system of FIG. 1 according to an aspect.

FIG. 8 illustrates a flow chart depicting example operations of the media content provider 106 implementing the group license exchange mechanism of the system 100 of FIG. 1 according to an aspect. Although the flowchart of FIG. 8 illustrates the operations 802-808 in sequential order, it will be appreciated that this is merely an example, and that additional or alternative operations may be included. Further, operations of FIG. 8 and related operations may be executed in a different order than that shown, or in a parallel or overlapping fashion.

A license group of media content may be determined (802). For example, the media content provider 106 may determine a license group 115. The media content provider 106 may indicate which media content 140 is part of the same license group 115, and assign the same group identifier 122 to each of the media content 140 belonging to the license group 115.

A key request with a group identifier and a content identifier may be sent to a license manager (804). For example, the media content provider 106 may send the key request 134 with the group identifier 122 and the content identifier 124. In particular, the media content provider 106 may send the key request 134 for the first media content 140-1 including the content identifier 124 that uniquely identifies the first media content 140-1, and the group identifier 122 of the first media content's license group 115.

A content key may be received from the license manager (806). For example, the media content provider 106 may receive the first content key 112-1 from the license manager 104 as part of the key response 136. Then, the media content may be encrypted with the content key (808). For example, the provider encryption unit 138 may encrypt the first media content 140-1 with the first content key 112-1.

Figure 9:
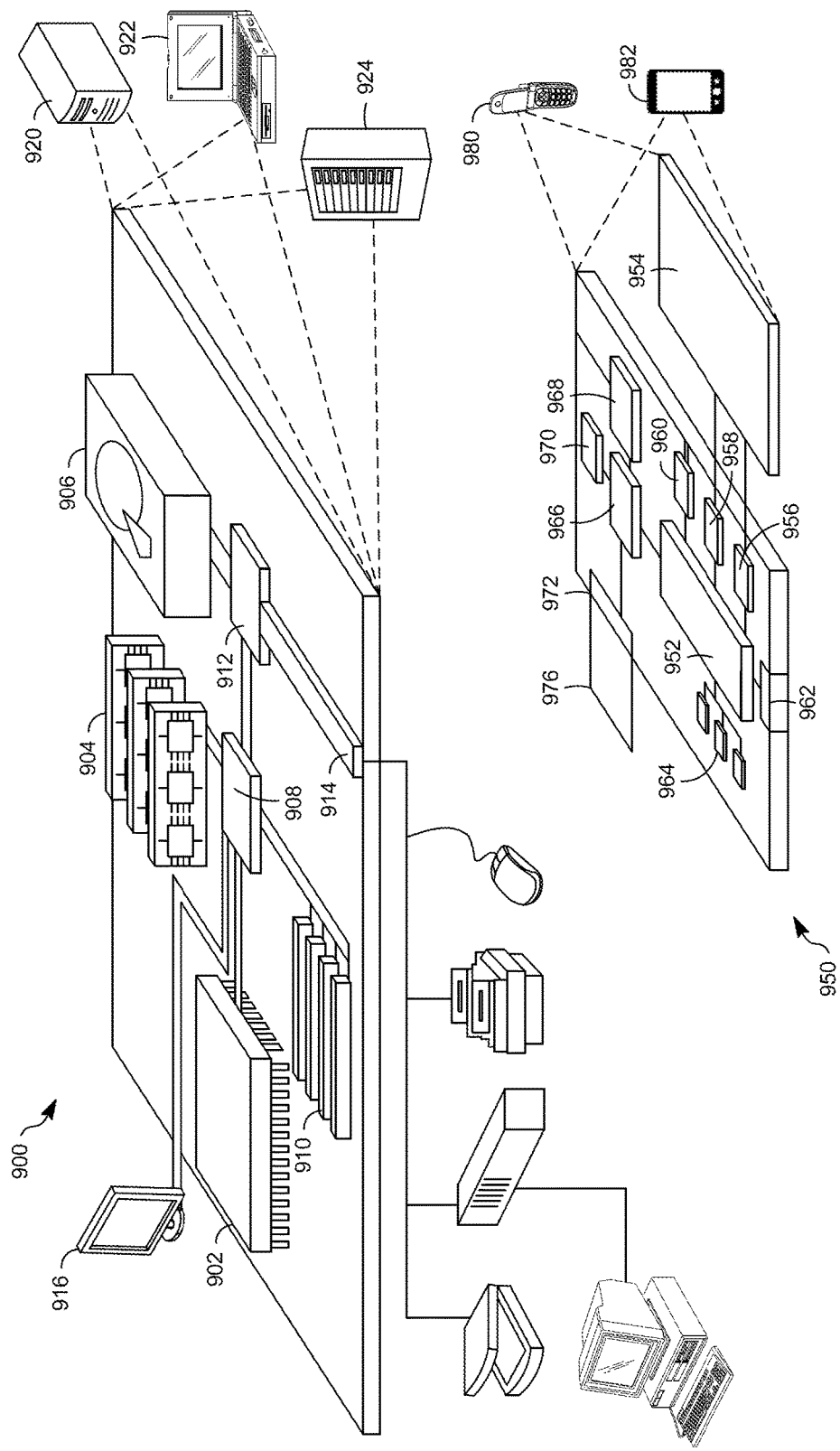
FIG. 9 is a block diagram showing example or representative computing devices and associated elements that may be used to implement the systems and methods of FIGS. 1-8.

FIG. 9 shows an example of a generic computer device 900 and a generic mobile computer device 950, which may be used with the techniques described here. Computing device 900 is intended to represent various forms of digital computers, such as laptops, desktops, tablets, workstations, personal digital assistants, televisions, servers, blade servers, mainframes, and other appropriate computing devices. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. The processor 902 can be a semiconductor-based processor. The memory 904 can be a semiconductor-based memory. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units.

Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, which may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

What is claimed is:

1. A method comprising:
    receiving, over a network, a license request from a client computing device requesting access to media content provided by a media content provider, the media content associated with a license group, the license request including a group identifier assigned to the license group among a plurality of license groups and a content identifier that identifies the media content, each of the plurality of license groups defining a different group of media content and being associated with a different master key;
    obtaining a master key for the license group using the group identifier, the master key being a key for the license group such that content keys for all media content that is part of the license group can be derived using the master key;
    deriving a content key for the media content based on the master key, the content identifier, and the group identifier using a key derivation function; and
    sending, over the network, a license to the client computing device and the license includes the master key and the content key such that the media content is configured to be decrypted at the client computing device using the content key and content keys for other media content that is part of the license group are configured to be obtained at the client computing device based on the master key, a respective content identifier, and the group identifier using the key derivation function.

2. The method of claim 1, wherein the master key is obtained from a master key database storing a plurality of master keys, each of the plurality of master keys corresponding to a different license group.

3. The method of claim 1, further comprising:
    encrypting the master key, wherein
    the license includes the encrypted master key.

4. The method of claim 1, further comprising:
    determining whether the media content is included within the license group based on an inclusion of the group identifier within the license request;
    deriving the content key without using the master key in response to the key request not including the group identifier.

5. The method of claim 1, further comprising:
    receiving a key request from the media content provider before the license request is received from the client computing device, the key request including the group identifier and the content identifier identifying the media content;
    deriving the content key using the key derivation function inputted with the master key, the group identifier, and the content identifier;
    returning the content key to the media content provider such that the media content is configured to be encrypted with the content key at the media content provider.

6. The method of claim 1, wherein the media content is first media content, and the license group include second media content, the first media content including a video track of a video file, the second media content including an audio track of the video file.

7. The method of claim 1, wherein the license group includes first media content, second media content, and third media content that relate to one or more video files.

8. The method of claim 7, wherein the first media content includes an audio track of a video file, the second media content includes a high-definition (HD) video track of the video file, and the third media content includes a standard-definition (SD) video track of the video file.

9. A non-transitory computer-readable medium storing executable instructions that when executed by at least one processor are configured to cause the at least one processor to:
    request access to media content provided by a media content provider for playback on a client computing device;
    determine whether the media content is part of a license group among a plurality of license groups, each of the plurality of license groups defining a different group of media content and being associated with a different master key;
    in response to the determination that the media content is part of the license group, determine whether a master key for the license group in which the media content is included was previously received at the client computing device;
    in response to the determination that the master key was not previously received at the client computing device, send, over a network, a license request to a license server, the license request including a content identifier identifying the media content and a group identifier assigned to the license group;
    receive, over the network, a license from the license server, the license permitting access to the media content, the license including the master key corresponding to the license group;
    in response to the determination that the master key was previously received at the client computing device, the license request is not sent, and the content key is derived based on a key derivation function using the previously received master key, the content identifier, and the group identifier; and decrypt the media content using the derived content key such that the media content is accessible.

10. The non-transitory computer-readable medium of claim 9, wherein the license also includes the content key, wherein the media content is decrypted using either the content key received as part of the license or the content key derived by the key generator for decrypting the media content.

11. The non-transitory computer-readable medium of claim 9, wherein, in response to the determination that the media content is not part of the license group, the content key is requested from the license server.

12. The non-transitory computer-readable medium of claim 9, wherein the license group include a plurality of video files movies, and the media content is a single video file within the license group.

13. The non-transitory computer-readable medium of claim 9, wherein the key derivation function includes an Advanced Encryption Standard (AES) function.

14. The non-transitory computer-readable medium of claim 9, wherein the license group includes first media content, second media content, and third media content that relate to one or more video files.

15. The non-transitory computer-readable medium of claim 14, wherein the first media content includes an audio track of a video file, the second media content includes a high-definition (HD) video track of the video file, and the third media content includes a standard-definition (SD) video track of the video file.

16. The non-transitory computer-readable medium of claim 14, wherein the first media content includes a first video file, the second media content includes a second media file, and the third media content includes a third video file.

17. The non-transitory computer-readable medium of claim 9, wherein the master key is a symmetric encryption key that is used to derive different content keys for all media content belonging to a single license group.

* * * * *